W. HUNT.
Testiug the Trueness of Axes.
No. 15,656.
Patented Sept. 2, 1856.
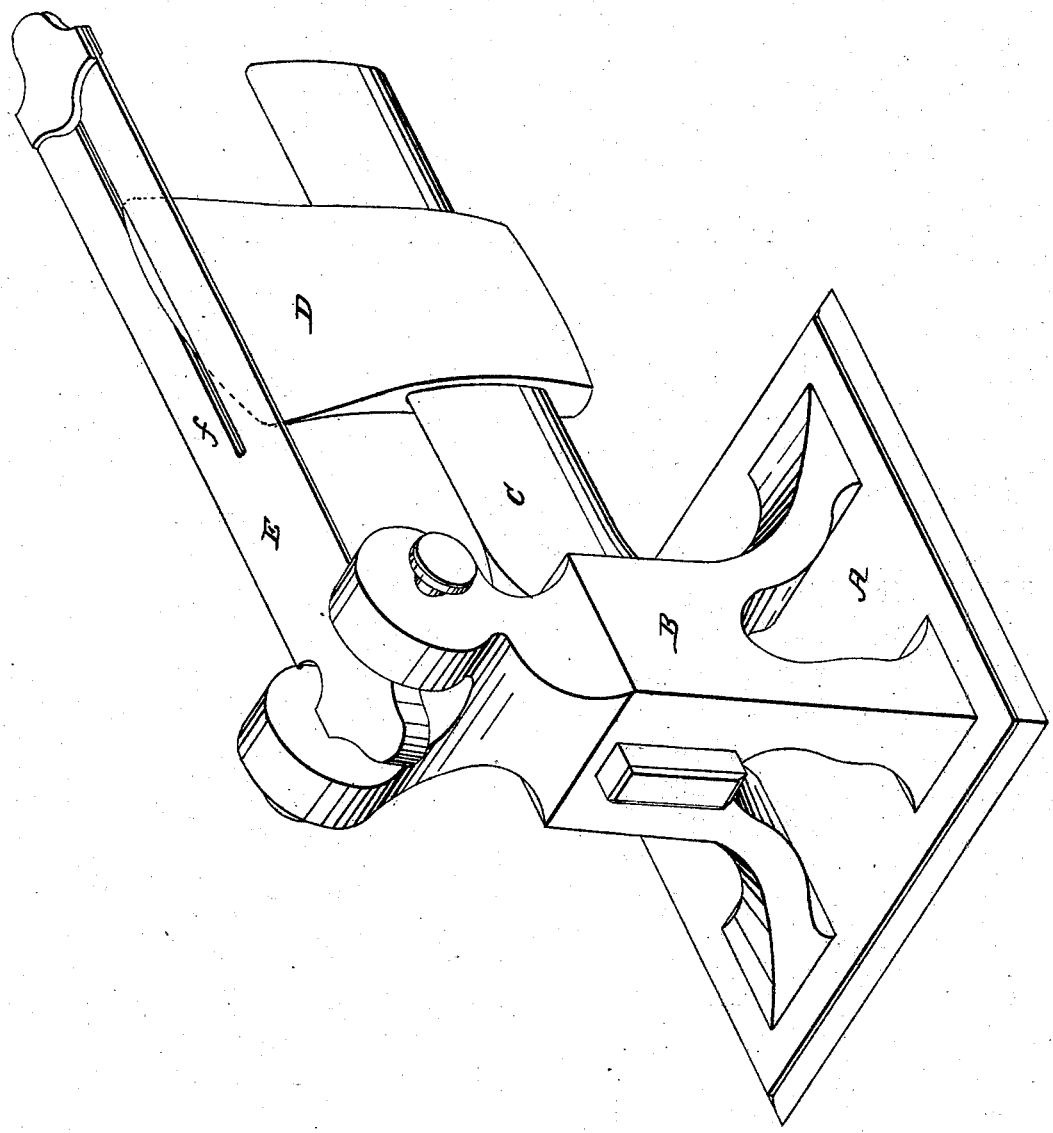

UNITED STATES PATENT OFFICE.

WARREN HUNT, OF EAST DOUGLASS, MASSACHUSETTS.

MACHINE FOR TESTING AXES.

Specification of Letters Patent No. 15,656, dated September 2, 1856.

*To all whom it may concern:*

Be it known that I, WARREN HUNT, of East Douglass, in the county of Worcester and State of Massachusetts, have invented a new and useful Machine or Tool for the Purpose of Testing the Trueness of Axes as They are Forged or Ground, of which the following is a full, clear, and exact description, reference being had to the accompanying drawing, in which is represented a perspective view of my machine.

It is very essential to the perfect operation of an ax that its cutting edge be in a plane passing through the axis of the helve, and my invention consists of a simple and effective tool, by the use of which the trueness of axes as they are forged or ground may be tested by the workmen as they proceed.

To enable others skilled in the art to understand my invention I will proceed to describe the manner in which I have carried it out.

In the accompanying drawing A, is the base to which is attached or cast the standard B. To this standard is secured a metallic bar C which tapers slightly toward its end and is of a size calculated to fill the eye of the ax D, and hold it motionless. E, is a gage plate which pivots in the top of the standards and may be raised and lowered in a plane passing through the axis of the bar C.

$f$ is a slot made through the gage plate directly over the center of the bar C.

The operation of this tool is as follows:

The ax is put upon the bar C, and is slipped up toward the standard until it fits tight, the gage plate is then allowed to descend upon the edge, when by placing the eye over the slot $f$, the smallest variation from true may be detected in the edge, the workman having one of these tools by his side tests each ax as it is forged or ground in the most expeditious manner, and far more perfectly than can be done by the means heretofore employed.

What I claim as my invention and desire to secure by Letters Patent, is—

The within described tool for testing the trueness of axes consisting essentially of the bar C, and slotted gage plate E, operating in the manner substantially as set forth.

WARREN HUNT.

Witnesses:
   EDWIN MOORE,
   OLIVERE HUNT.